(12) United States Patent
De Vos et al.

(10) Patent No.: US 8,974,271 B2
(45) Date of Patent: Mar. 10, 2015

(54) FILLETING DEVICE AND METHOD FOR HARVESTING FILLETS

(75) Inventors: Ferdinand Allard De Vos, Oostzaan (NL); Pieter Willem Vonk, Oostzaan (NL); Martinus Casper Melchior Balthasar Waasdijk, Oostzaan (NL); Michael George Lourentius Koopman, Oostzaan (NL)

(73) Assignee: Meyn Food Processing Technology B.V., Oostzaan (NL)

(*) Notice: Subject to any disclaimer, the term of this patent is extended or adjusted under 35 U.S.C. 154(b) by 714 days.

(21) Appl. No.: 12/704,787

(22) Filed: Feb. 12, 2010

(65) Prior Publication Data

US 2010/0210199 A1 Aug. 19, 2010

(30) Foreign Application Priority Data

Feb. 13, 2009 (NL) .................................... 2002524
Feb. 27, 2009 (NL) .................................... 1036646

(51) Int. Cl.
*A22C 17/02* (2006.01)
*A22C 21/00* (2006.01)

(52) U.S. Cl.
CPC .................................... *A22C 21/003* (2013.01)
USPC .......................................... 452/136; 452/138

(58) Field of Classification Search
USPC ................. 452/125, 127, 130, 135–136, 138, 452/150–151, 161
See application file for complete search history.

(56) References Cited

U.S. PATENT DOCUMENTS

| 4,648,156 | A | * | 3/1987 | Meyn ............................ 452/136 |
| 4,682,386 | A | | 7/1987 | Hazenbroek et al. |
| 4,688,297 | A | | 8/1987 | Bartels |
| 4,827,570 | A | * | 5/1989 | Scheier et al. ................ 452/136 |
| 4,993,114 | A | * | 2/1991 | Meyer et al. .................. 452/136 |
| 5,098,337 | A | | 3/1992 | Landt et al. |
| 5,269,722 | A | | 12/1993 | Diesing et al. |
| 5,372,539 | A | | 12/1994 | Kunig et al. |
| 5,833,527 | A | * | 11/1998 | Hazenbroek et al. ......... 452/170 |
| 6,280,311 | B1 | | 8/2001 | Kuck |
| 7,344,437 | B2 | | 3/2008 | Van Den Nieuwelaar et al. |
| 2009/0170417 | A1 | | 7/2009 | Janssen et al. |

FOREIGN PATENT DOCUMENTS

| DE | 41 05 564 A1 | 8/1992 |
| EP | 0 591 741 A1 | 4/1994 |
| EP | 0 695 506 A2 | 2/1996 |
| EP | 0 756 826 A2 | 2/1997 |
| EP | 1 346 639 A1 | 9/2003 |
| EP | 1 574 133 A1 | 9/2005 |
| EP | 1 454 531 B1 | 5/2007 |
| WO | WO 2007/067052 | 6/2007 |

* cited by examiner

OTHER PUBLICATIONS

Search report for NL 1036646, Sep. 8, 2009.

*Primary Examiner* — David Parsley
(74) *Attorney, Agent, or Firm* — Dority & Manning, P.A.

(57) ABSTRACT

A filleting device and method for harvesting fillets from poultry carcasses that are moved in a conveyer-line supported on carriers is provided. In one exemplary embodiment, the first guide rails are provided to guide at least a part of the fillets so as to increase this part's distance from the carcass and break the tissue connections that connect the fillet or fillets in their natural position to the keel-bone of the carcass. Flexible elements are provided that complete the harvesting of the fillets by peeling the fillets entirely loose from the keel-bone.

21 Claims, 5 Drawing Sheets

FILLETING DEVICE AND METHOD FOR HARVESTING FILLETS

FIELD OF THE INVENTION

The invention relates to a filleting device and method for harvesting fillets from poultry carcasses that are moved in a conveyer-line supported on carriers.

BACKGROUND OF THE INVENTION

A filleting device is known from Applicant's earlier European patent EP-B 1 454 531.

From U.S. Pat. No. 5,372,539 a filleting device for harvesting fillets from poultry carcasses is known, wherein the carcasses are moved in a conveyer-line supported on carriers, comprising first means to guide at least a part of the fillets so as to increase this part's distance from the carcass and break the tissue connections that connect the fillet or fillets in their natural position to the keel-bone of the carcass, and comprising second means that complete the harvesting of the fillets by peeling the fillets entirely loose from the keel-bone.

SUMMARY OF THE INVENTION

Objects and advantages of the invention will be set forth in part in the following description, or may be obvious from the description, or may be learned through practice of the invention.

In the automatic harvesting of fillets from poultry carcasses, there is a continued demand for higher operating rates. It is an object of the invention to provide a method and filleting device which can meet these demands for higher rates.

A further object of the invention is to be able to process carcasses that are conveyed on carriers that have varying distances such that the filleting device can operate independently from, and without knowing, the precise position that a carcass assumes in the train of carriers that moves in the path of the conveyer-line.

It is still a further object of the invention to provide a filleting device that can operate on poultry carcasses supported by the carriers, whereby the carriers move at different speeds.

These and other objects of the invention are attained by the method and filleting device for harvesting fillets from poultry carcasses in accordance with one or more of the appended claims.

In a device of the invention, the first means for increasing part of the fillet's distance to the carcass and break the tissue connections of the fillet or fillets with the keel-bone, is a first guide rail or rails. By the subsequent operation of the first guide rail or rails and the second means that complete the harvesting of the fillets by peeling the fillets entirely loose from the keel-bone, the fillets can be harvested to the greatest possible extent without leaving much appreciable meat on the carcass.

In a first exemplary aspect of the invention, the operation of the filleting device for initially pushing or pulling part of the fillets from the carcass can be done securely and reliably by moving the carcass with the fillets towards a first guide rail or rails which are placed such that, as seen from their entry section and looked in the movement-direction of the carriers for the poultry carcasses, the guide rail or rails first occupy an initial position at a distal side of the fillets with respect to the carcass, and eventually occupy a final position at the proximal side of the fillets with respect to the carcass, and that from the initial position to the final position the first guide rail or rails occupy a decreasing distance to the keel-bone. This not only causes that the tissue connections with which the fillets are connected to the carcass can be effectively broken; it also secures that the subsequent harvesting by the second means for peeling the fillets entirely loose from the keel-bone can be effectively and reliably carried out.

For the just mentioned purpose, it is preferable that the second means for peeling the fillets entirely loose from the keel-bone is a pulling device which is placed in or adjacent to the path of the keel-bone.

It is further preferable that the pulling device has a groove which is arranged to receive the keel-bone, and which groove has a width so as to cause that the groove scrapes the keel-bone's sides. This supports the device's effectiveness in removing as much meat as possible from the carcass.

A further desirable feature is that the pulling device has a groove having a depth so as to cause that in use the groove's bottom touches the keel-bone of the moving carcass. This causes that any membranes that maintain a connection between the fillets and the carcass are loosened and that the harvesting of the fillets can be executed very easily.

The flexibility and broad applications possibile with the filleting device of the invention are further promoted by having the pulling device mounted in or on a movable frame in certain exemplary embodiments so as to enable the pulling device to follow the keel-bone's curvature.

A preferred exemplary embodiment to realize the capability of the pulling device to follow the keel-bone's curvature is by having the frame pivotally mounted on a support.

A preferred exemplary embodiment of the pulling device that is used for peeling the fillets entirely loose from the keel-bone, is to implement same as a roller. It is then preferable that in use the roller rotates so to have its circumference move in a direction opposite to the conveying direction of the carcasses at the location where the roller contacts the fillets. Under certain circumstances, the roller may beneficially be provided with teeth or grooves in its outer circumference in order to increase its grip on the fillet meat.

It is further preferred that during the conveyance of a carcass, a force is applied to the fillets to counteract the pulling force and peeling force that are applied for increasing the distance of a part of the fillets to the carcass, and for the entire loosening of the fillets from the carcass. This way the reliability of the operation of the filleting device of the invention can be promoted.

The just mentioned operation to counteract the pulling force and the peeling force can be effected by having the feed device include third pressing means that support the fillets while the carcass is conveyed by its moving carrier.

Notably, one thing and another is then advantageously implemented such that the third pressing means are arranged to push the fillets against the first guide rail or rails and/or the device.

A preferred exemplary embodiment of the feed device has the feature that the third pressing means includes a rotor having flexible flaps or brushes extending therefrom that are arranged to support the fillets while the carcass is conveyed by its carrier. It is then further preferable that in use the rotor has a rotational speed to cause the speed of the flaps to be equal or higher than the speed of the moving carcass.

Furthermore, a desirable feature of an exemplary filleting device of the invention is that following the second means that complete the harvesting of the fillets there is a second guide rail for moving the harvested fillets to a discharge and/or to a further processing device for the fillets.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Wherever in the figures the same reference numerals are applied, these numerals refer to the same parts.

DETAILED DESCRIPTION

Figure 1:
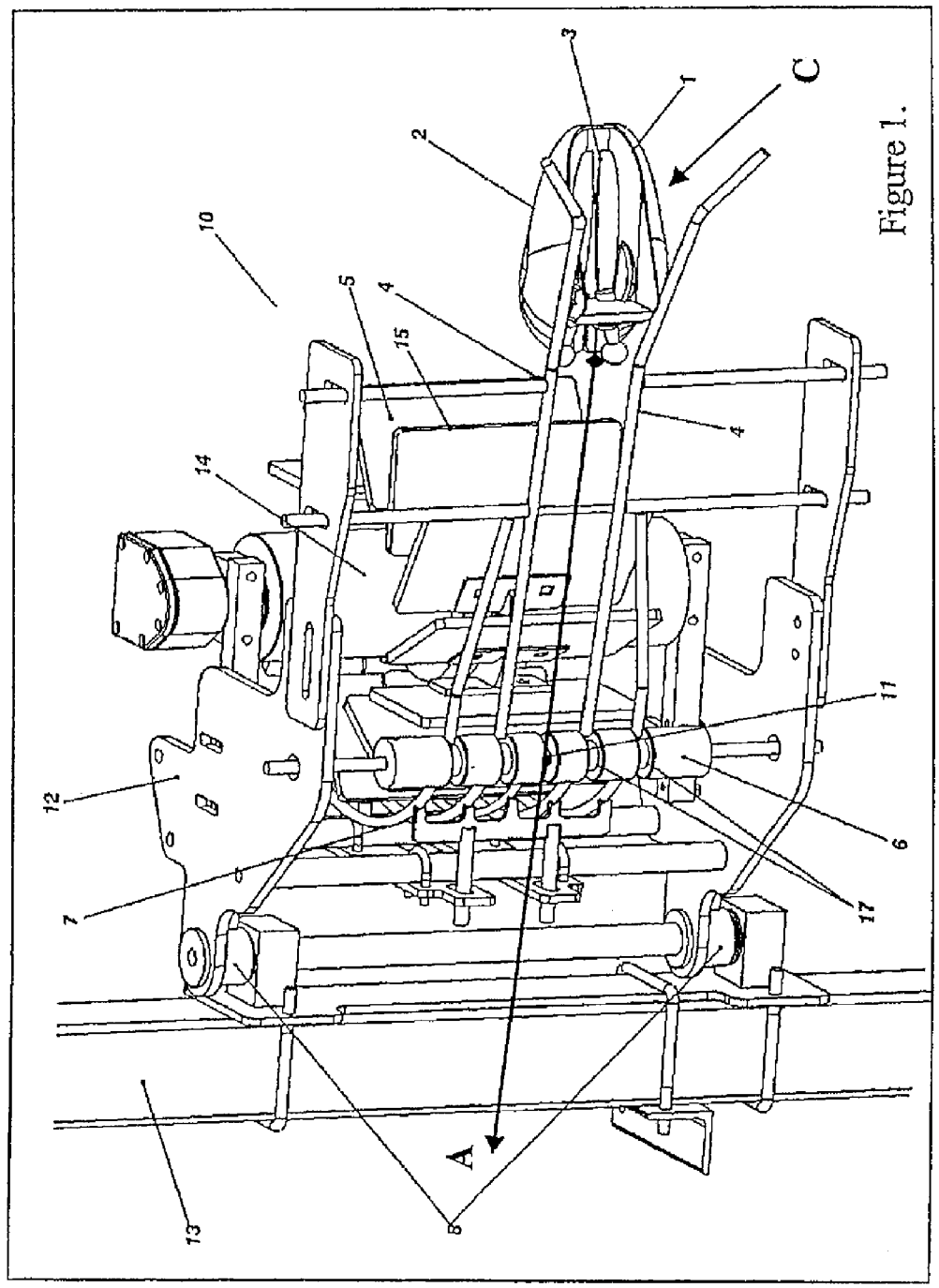
FIG. 1 shows a perspective view of an exemplary filleting device of the invention.
Figure 2:
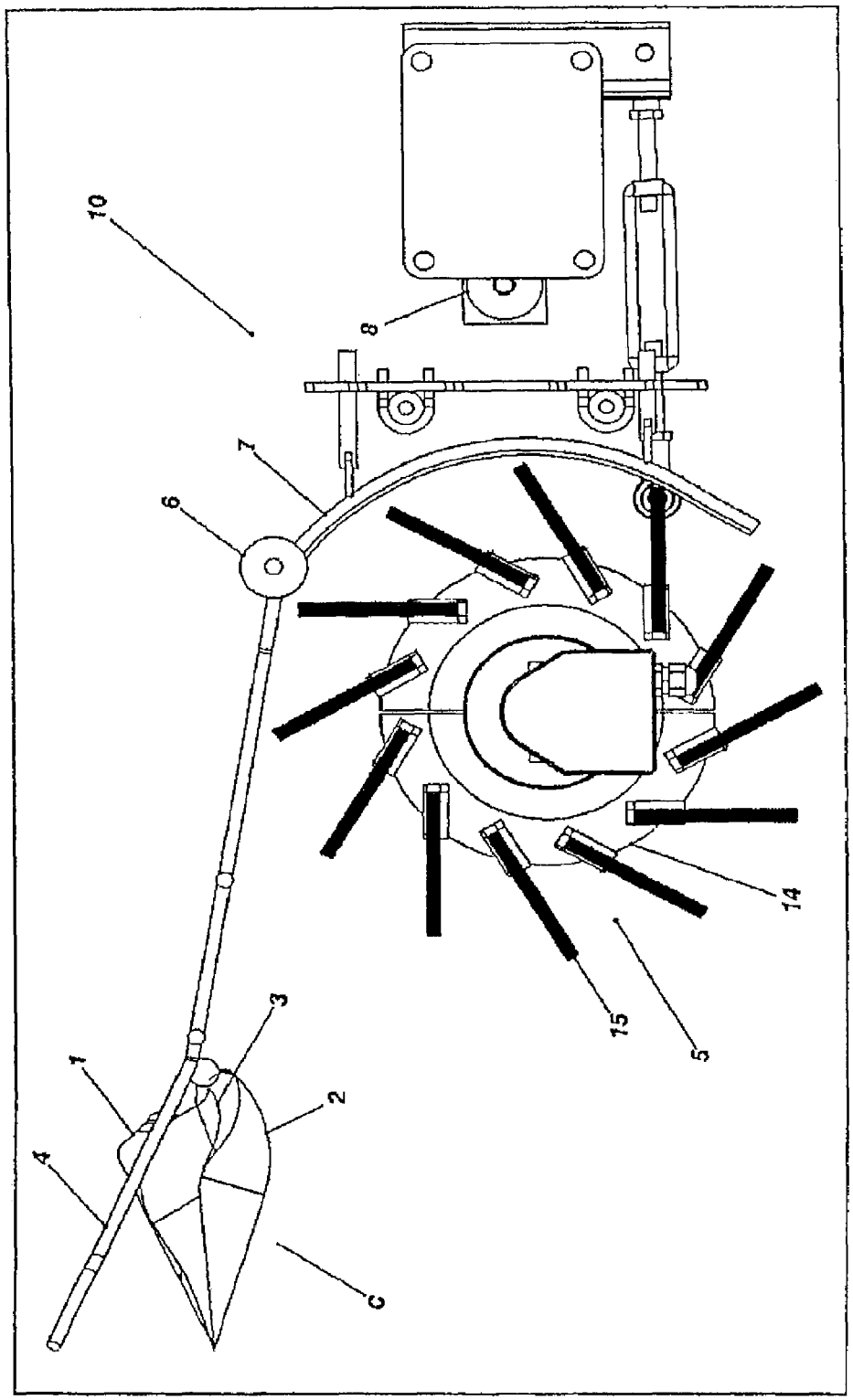
FIGS. 2 through 5 show an exemplary filleting device of the invention in a side-view in several subsequent operational stages of the exemplary device in accordance with the invention.

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

The figures show a poultry carcass 1 that is in a known manner supported by a carrier being one of a series of carriers that are moved in a conveyor-line along one or more processing stations. This is common to the artisan and the exact showing of the carrier or carriers along a conveyor line in the figures can therefore be dispensed with.

Figure 3:
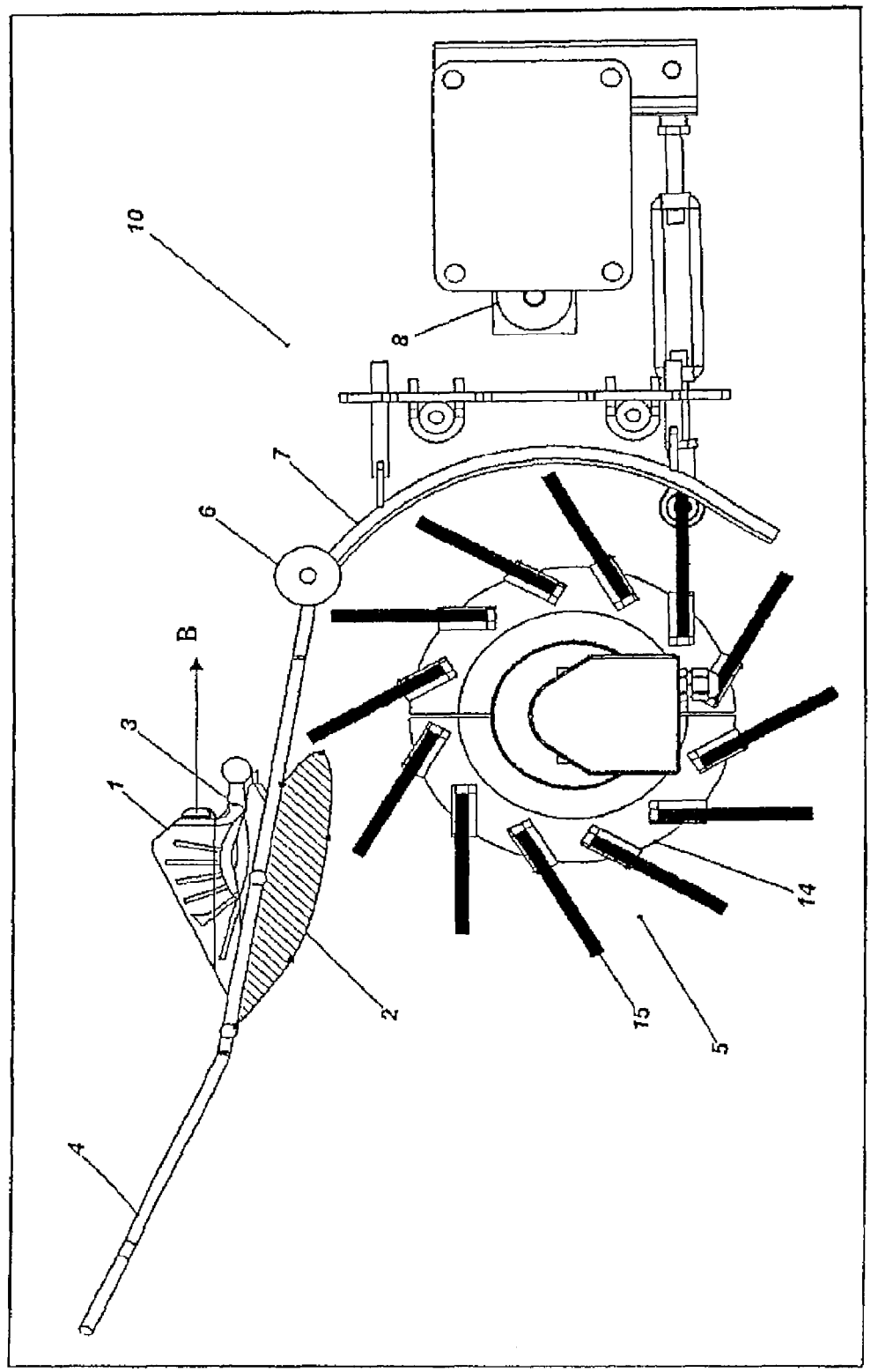
Figure 4:
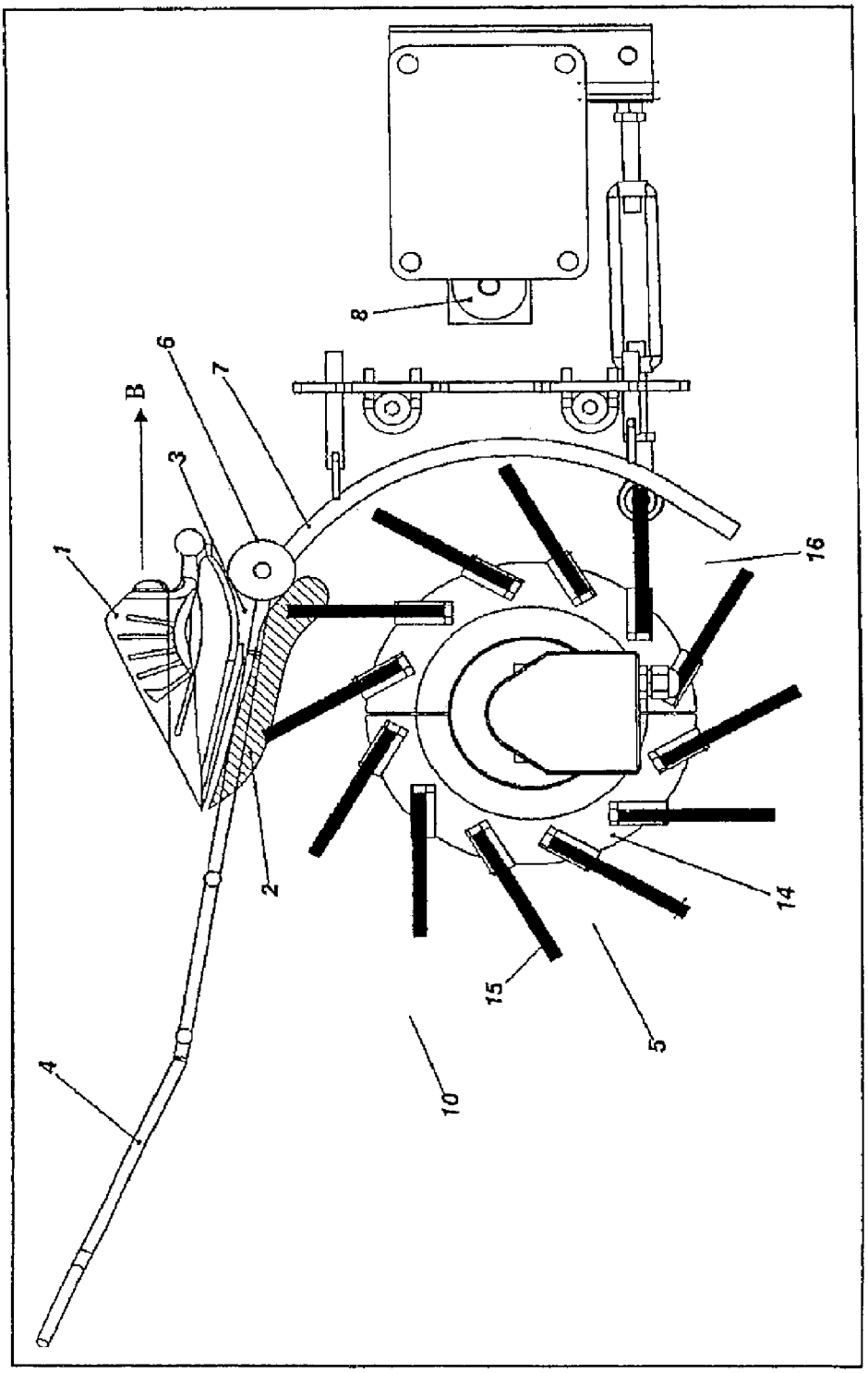
Figure 5:
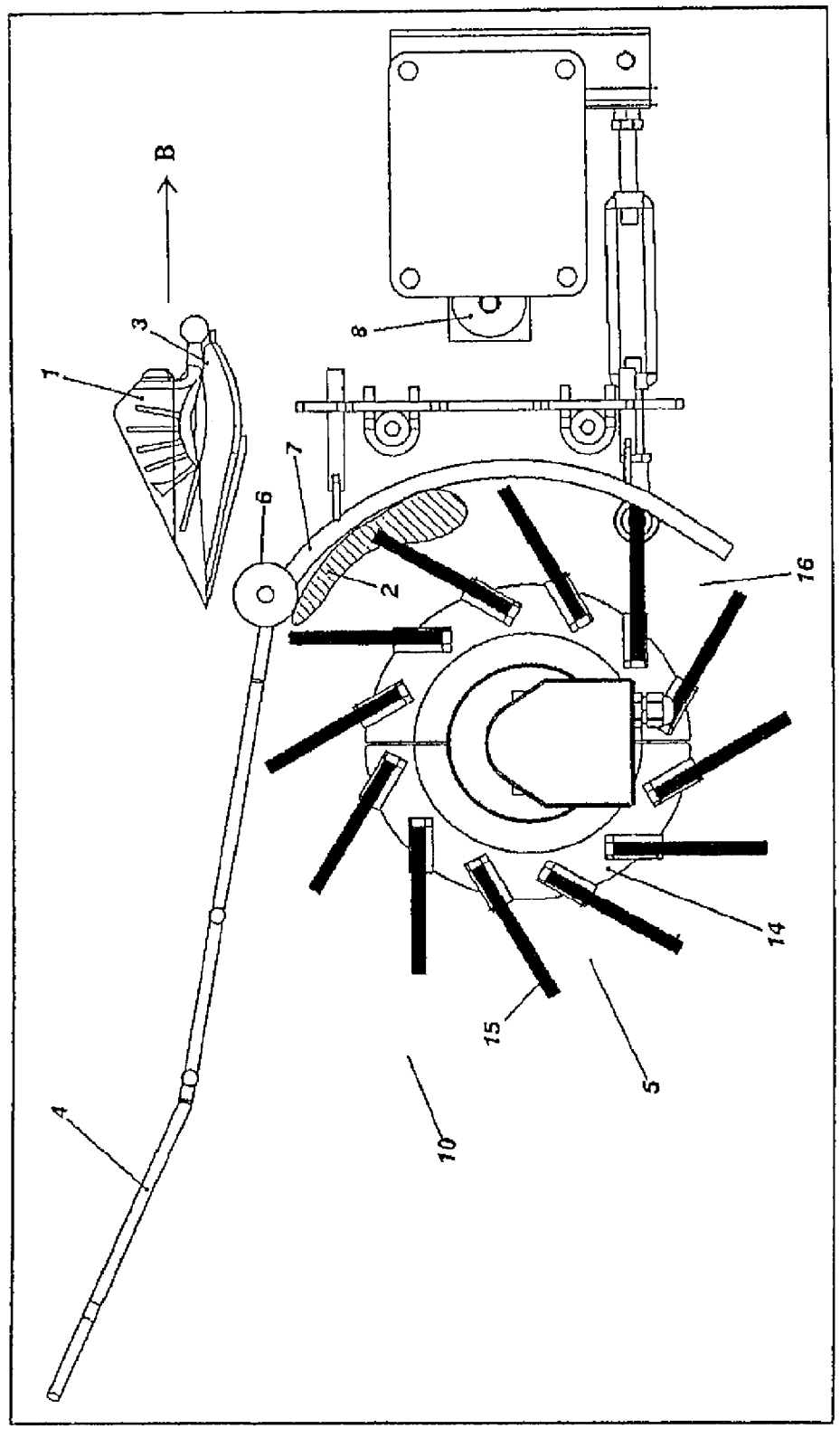

Each of the carriers transporting a carcass 1 follows a conveying path which in FIG. 1 is indicated with arrow A. In FIGS. 3-5 this conveying path of each carrier supporting a carcass 1 is indicated with arrow B.

In general, an exemplary filleting device of the invention as shown in FIGS. 1-5 bears reference numeral 10.

The filleting device 10 is an apparatus that can be part of a conveyor-line or can be detached therefrom as a separate device. This device 10 can be placed in an existing conveyor-line if the need arises to improve the results of harvesting fillets with the concerning line to the highest attainable level.

The exemplary filleting device 10 of the invention includes first means 4 that act to spread at least a part of the fillets 2 so as to increase the distance of these parts from the carcass 1, and to break the tissue connections that connect the fillets 2 in their natural position to the keel-bone 3 of the carcass 1. This operation of pushing results in the position of the fillets 2 as shown in FIG. 3. The pushing operation may be replaced or supplemented with a pulling operation, depending on the circumstances or the preferences of the operator of the harvesting-line.

In order to effectively implement the first means 4 for increasing part of the fillet's distance to the carcass 1 and break the tissue connections of the fillet or fillets with the keel-bone 3, it is preferable to implement these first means 4 as guide rails 4, the shape of which guide rails 4 is clearly shown in FIG. 1 and the operation of which can be clearly understood with reference to FIGS. 3 and 4.

With reference to FIGS. 1, 3 and 4 it can be clearly seen that the first guide rail or rails 4 are placed such that as seen from their entry section indicated with arrow C and looked therefrom in the movement-direction A of the carriers for the poultry carcasses 1, the first guide rail or rails 4 first occupy an initial position at the distal side of the fillets 2 with respect to the carcass 1 (see FIG. 2) and eventually occupy a final position at the proximal side of the fillets 2 with respect to the carcass 1 (see FIG. 3), and that going from the initial position to the final position, the first guide rail or rails 4 occupy a decreasing distance to the keel-bone 3. This latter aspect is most clearly shown in FIG. 1.

The filleting device 10 further includes second means 6 that become operative after the fillets 2 have been placed partly at some appreciable distance from the carcass 1 wherein the tissue connections that connect the fillets 2 in their natural position to the keel-bone 3 of the carcass 1 have been broken. By the operation of the second means 6 the harvesting of the fillets 2 is completed by peeling the fillets 2 entirely loose from the keel-bone 3.

From the figures it is clear that the device 6 which is used for peeling the fillets 2 entirely loose from the keel-bone 3 is placed in or adjacent to the path of the keel-bone 3. This follows most clearly from FIGS. 3, 4 and 5.

For the exemplary embodiment of FIG. 1 it is shown that the device 6 is preferably a roller and that this device 6 has a groove 11 that is located in the path of the keel-bone 3 and arranged to receive this keel-bone 3. Furthermore the groove 11 has a width so as to cause that the groove 11 scrapes the keel-bone's sides when the keel-bone 3 is in the groove of the device 6, as shown in FIG. 4. Furthermore, the groove 11 of the device 6 has a depth such that during use the bottom of the groove 11 touches the keel-bone 3 of the moving carcass 1. The roller can also be provided with circumferential grooves or teeth, which extend transversely to the groove 11 that is for receiving the keel-bone 3. Such transversely provided grooves or teeth increase the roller's grip on the meat of the fillets.

FIG. 1 further clearly shows that the pulling device 6 is mounted in or on a movable frame 12, so as to enable the pulling device 6 to follow the curvature of the keel-bone 3. For this purpose the frame 12 is mounted on a support 13 using hinges 8 that allow the frame 12 to pivot with respect to the support 13.

As best seen in FIGS. 2-5, the filleting device 10 of the invention further includes third pressing means 5 for supporting the fillets 2 while the carcass 1 is conveyed by its supporting carrier.

FIGS. 2-5 schematically show that the pressing means 5 are arranged to support the fillets 2 against the first guide rails 4 and/or the device 6.

In order to effectuate the intended action of the pressing means 5 so that it will follow the fillets 2 with at least the same speed as the fillets 2 move in the direction B, it is preferably that the third pressing means 5 includes a rotor 14 having flexible flaps 15 or brushes extending therefrom. The flaps 15 or brushes are arranged to support the fillets 2 while the carcass 1 is conveyed by its carrier. In this action the rotor 14 preferably has a rotational speed such that the speed of the flap 15 or brushes is as high or slightly higher than the speed of the moving carcass 1, so that friction between the flaps 15 or brushes and the fillets 2 is substantially avoided.

Particularly, FIGS. 2-5 show that following the device 6 that completes the harvesting of the fillets, there is a second guide rail 7 for moving the harvested fillets to a discharge as shown in FIG. 5 with reference numeral 16. Next to this discharge 16 it is also possible to apply a further processing device or inspection station for the fillets 2.

In use the harvesting device 10 of the invention operates as follows. A poultry carcass 1 or part thereof is conveyed in the direction of arrow A along the harvesting device 10 as shown in FIG. 1. During this conveyance the breast fillets 2 are accurately placed and spread out by a specially formed first guide rail 4 as clearly shown in FIGS. 1, 2 and 3. The first guide rail or rails 4 provide stability to the breast fillets 2. Simultaneously a fixation of the breast fillets 2 is carried out by the counteracting force executed by means of the rotating flaps 15 which move together with the carcass 1 at the same or a comparable speed. It is preferable that the flaps 15 are of a flexible material, preferably a synthetic material. While the carcass 1 moves further in its direction of movement A, B, the fillets 2 will be encountered by the guide rails 4 and fixed in position by the flaps 15, and separated entirely from the carcass 1 by the action of the rotating grooved roller 6 in a peeling motion. The grooved roller 6 rotates in a direction opposite to the conveying direction of the fillets 2, and this opposite movement provides the separating peeling motion with which the fillets 2 are removed from the carcass 1. The grooved roller 6 follows during its peeling motion the keel-bone 3 of the concerning carcass 1 and in order to make this movement possible, the roller 6 is mounted in a frame 12 (see FIG. 1) which is connected with hinges 8 to a support 13.

The roller 6 may have further grooves 17 to provide effective guidance to the fillets 2 during the peeling motion. Also during peeling of the fillets 2 from the carcass 1 the flaps 15 continue to provide supporting forces to the fillets 2 during their motion along the guide rails 4 and the roller 6 respectively.

Although the illustrated example of a preferred embodiment shows the flaps 15 being mounted on a rotor 14, it is also possible to have the flaps 15 or a similar arrangement follow a linear track whilst providing counteracting forces to the fillets 2 of the carcass 1.

After the carcass 1 has passed the roller 6 and the fillets 2 are completely taken loose from said carcass 1, the said fillets 2 are guided by a second guide rail 7, which may also be implemented as a continuation of the first guide rail 4, in order to guide the fillets 2 to a discharge 16 which may be followed by a further processing device or inspection station for quality control of the harvested fillets 2.

It is expressly stated and underlined that the scope of protection of the appended claims is to be determined by the claims only, and without construing the claims to match exactly the above discussed exemplary embodiment. This exemplary embodiment only serves to elucidate and clarify the terms of the claims without intention to restrict the scope of said claims. While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

The invention claimed is:

1. A filleting device for harvesting fillets from poultry carcasses that are moved along a conveyor path of a conveyor line and supported on carriers, the device comprising:
    first guide rails positioned proximate to the conveyor line and extending generally along the direction of movement of the conveyor line, said first guide rails diverging away from the conveyor path along the direction of movement of the conveyor line;
    said first guide rails also positioned for guiding at least a part of the fillets in a manner that increases the fillets' distance from its carcass and breaks the tissue connections between the fillets and a keel-bone of the carcass as the carcass is transported along the conveyor line,
    said first guide rails also positioned relative to the conveyor line such that as the carcass moves along the conveyor line, said first guide rails have a first position at a distal side of the fillets with respect to the carcass and then eventually have a second position at a proximal side of the fillets with respect to the carcass,
    said first guide rails further positioned such that the distance between the first guide rails and the keel bone of the carcass decreases as the carcass moves from the first position to the second position;
    means for peeling the fillets from the carcass so as to provide complete separation between the fillets and the keel bone, said means for peeling the fillets from the carcass comprising at least one roller that is positioned along the path of the keel bone and is configured for pulling the fillets from the keel bone; and
    pressing means for supporting the fillets as the carcass is moved along the conveyor line, wherein said pressing means for supporting the fillets is positioned to keep the fillets positioned against the first guide rails and said means for peeling the fillets from the carcass, said pressing means for supporting the fillets comprising flexible elements arranged to support the fillets while the carcass is moved along the conveyor line.

2. A filleting device for harvesting fillets from poultry carcasses as in claim 1, wherein said means for peeling the fillets from the carcass is positioned along the path of the keel bone and is configured for pulling the fillets from the keel bone.

3. A filleting device for harvesting fillets from poultry carcasses as in claim 2, wherein said means for peeling the fillets from the carcass comprises a groove that is arranged to receive the keel bone, said groove having a width that causes the groove to scrape the sides of the keel bone.

4. A filleting device for harvesting fillets from poultry carcasses as in claim 2, wherein said means for peeling the fillets from the carcass comprises a groove having a depth that causes the bottom of said groove to contact the keel bone as its carcass is moved along the conveyor line.

5. A filleting device for harvesting fillets from poultry carcasses as in claim 2, further comprising a movable frame, wherein said means for peeling the fillets from the carcass is positioned upon said movable frame so as to allow said means for peeling the fillets to follow the curvature of the keel bone.

6. A filleting device for harvesting fillets from poultry carcasses as in claim 5, wherein said movable frame is pivotally mounted to a support.

7. A filleting device for harvesting fillets from poultry carcasses as in claim 1, further comprising pressing means for supporting the fillets as the carcass is moved along the conveyor line.

8. A method for harvesting fillets from poultry carcasses being moved along a conveyor line, comprising the steps of:
- transporting a poultry carcass towards first guide rails positioned proximate to the conveyor line, extending generally in the direction of movement of the conveyor line, and diverging away from the conveyor line along the direction of movement of the conveyor line;
- moving at least part of the fillets away from the poultry carcass by moving the poultry carcass so as to change the first guide rails from a first position at a distal side of the fillets to a second position at the proximate side of the fillets while simultaneously decreasing the distance from the first guide rails to the keel bone of the carcass,
- peeling the fillets apart completely from the keel bone of the carcass; and
- pressing the fillets as the carcass is moved along the conveyor line so as to keep the fillets positioned against the first guide rails, said step of pressing comprising positioning flexible elements to support the fillets while the carcass is moved along the conveyor line.

9. A method for harvesting fillets from poultry carcasses being moved along a conveyor line as in claim 8, wherein said peeling step further comprises pulling the fillets apart from the keel bone while scraping the sides of the keel bone.

10. A method for harvesting fillets from poultry carcasses being moved along a conveyor line as in claim 8, wherein said peeling step further comprises applying a pulling device to the carcass, the pulling device having a groove that is configured to receive the keel of the carcass so as to effect a scraping of the sides of the keel bone while the carcass moves past the pulling device.

11. A method for harvesting fillets from poultry carcasses being moved along a conveyor line as in claim 10, wherein the pulling device pivots so as to follow the curvature of the keel bone.

12. A method for harvesting fillets from poultry carcasses being moved along a conveyor line as in claim 8, wherein said peeling step further comprises applying a roller to the carcass, the roller configured so as to rotate in a direction opposite to the movement of the carcass along the conveyor at the location where the roller contacts the fillets.

13. A filleting device for harvesting fillets from poultry carcasses that are moved in a conveyor line and supported on carriers, the device comprising:
- first guide rails positioned proximate to the conveyor line and extending generally along the direction of movement of the conveyor line,
  - said first guide rails also positioned for guiding at least a part of the fillets in a manner that increases the fillets' distance from its carcass and breaks the tissue connections between the fillets and a keel-bone of the carcass as the carcass is transported along the conveyor line,
  - said first guide rails also positioned relative to the conveyor line such that as the carcass moves along the conveyor line, said first guide rails have a first position at a distal side of the fillets with respect to the carcass and then eventually have a second position at a proximal side of the fillets with respect to the carcass,
  - said first guide rails further positioned such that the distance between the first guide rails and the keel bone of the carcass decreases as the carcass moves from the first position to the second position;
- means for peeling the fillets from the carcass so as to provide complete separation between the fillets and the keel bone, said means for peeling the fillets comprising at least one roller that is positioned along the path of the keel bone and is configured for pulling the fillets from the keel bone; and
- pressing means for supporting the fillets as the carcass is moved along the conveyor line, wherein said pressing means is located so as to keep the fillets positioned against the first guide rails and said at least one roller, and wherein said pressing means comprises
  - a rotor; and
  - flexible elements extending from the rotor and arranged to support the fillets while the carcass is moved along the conveyor line.

14. A filleting device for harvesting fillets from poultry carcasses that are moved in a conveyor line and supported on carriers, the device comprising:
- first guide rails positioned proximate to the conveyor line and extending generally along the direction of movement of the conveyor line,
  - said first guide rails also positioned for guiding at least a part of the fillets in a manner that increases the fillets' distance from its carcass and breaks the tissue connections between the fillets and a keel-bone of the carcass as the carcass is transported along the conveyor line,
  - said first guide rails also positioned relative to the conveyor line such that as the carcass moves along the conveyor line, said first guide rails have a first position at a distal side of the fillets with respect to the carcass and then eventually have a second position at a proximal side of the fillets with respect to the carcass,
  - said first guide rails further positioned such that the distance between the first guide rails and the keel bone of the carcass decreases as the carcass moves from the first position to the second position;
- means for peeling the fillets from the carcass so as to provide complete separation between the fillets and the keel bone, said means for peeling the fillets comprising at least one roller that is positioned along the path of the keel bone and is configured for pulling the fillets from the keel bone; and
- pressing means for supporting the fillets as the carcass is moved along the conveyor line, wherein said pressing means for supporting the fillets is positioned to keep the fillets positioned against the first guide rails and said means for peeling the fillets from the carcass, and wherein said pressing means comprises
  - a rotor; and
  - flexible elements extending from the rotor and arranged to support the fillets while the carcass is moved along the conveyor line.

15. A filleting device for harvesting fillets from poultry carcasses, the poultry carcasses each having a keel bone, the filleting device comprising:
- a conveyor line defining a conveyor path;
- a carrier configured for receipt and support of a poultry carcass, said at least one carrier movable along the conveyor path of said conveyor line;
- a pulling device positioned proximate to the conveyor path of said conveyor line and configured to provide complete separation between the fillets and the keel bone of a poultry carcass;
- first guide rails positioned proximate to the conveyor path of said conveyor line, said first guide rails having an entry section, said first guide rails extending between the entry section and said pulling device and diverging away from the conveyor path in a direction from the entry section towards said pulling device, wherein said first guide rails guide at least a part of the fillets in a manner that increases the fillets' distance from its carcass and breaks the tissue connections between the fillets and a keel-bone of the carcass as the carcass is transported along the conveyor path of the conveyor line; and pressing means for supporting the fillets as the carcass is moved along the conveyor line, said pressing means for supporting the fillets located relative to said first guide rails so as to keep the fillets positioned against said first guide rails and said pulling device, said pressing means for supporting the fillets comprising flexible elements arranged to support the fillets while the carcass is moved along the conveyor line.

16. A filleting device for harvesting fillets from poultry carcasses as in claim 15, wherein said pulling device is positioned along the path of keel bones of the poultry carcasses.

17. A filleting device for harvesting fillets from poultry carcasses as in claim 16, wherein said pulling device comprises a groove that is arranged to receive the keel bones, said groove having a width that causes the groove to scrape the sides of the keel bones.

18. A filleting device for harvesting fillets from poultry carcasses as in claim 17, wherein the groove of said pulling device has a depth that causes the bottom of the groove to contact the keel bones as the carcasses are moved along the conveyor line.

19. A filleting device for harvesting fillets from poultry carcasses as in claim 15, further comprising a movable frame, wherein said pulling device is positioned upon said movable frame so as to allow said pulling device to follow the curvature of the keel bones.

20. A filleting device for harvesting fillets from poultry carcasses as in claim 19, wherein said movable frame is pivotally mounted to a support.

21. A filleting device for harvesting fillets from poultry carcasses as in claim 20, wherein said pulling device comprises at least one roller that is positioned along the path of the keel bone and is configured for pulling the fillets from the keel bone.

* * * * *